(12) United States Patent
Friend

(10) Patent No.: US 10,122,609 B2
(45) Date of Patent: Nov. 6, 2018

(54) DATA CAPTURE

(71) Applicant: BAE SYSTEMS PLC, London (GB)

(72) Inventor: Gordon Campbell Friend, Guildford Surrey (GB)

(73) Assignee: BAE SYSTEMS plc, London (GB)

( * ) Notice: Subject to any disclaimer, the term of this patent is extended or adjusted under 35 U.S.C. 154(b) by 138 days.

(21) Appl. No.: 15/107,547

(22) PCT Filed: Dec. 22, 2014

(86) PCT No.: PCT/EP2014/078994
§ 371 (c)(1),
(2) Date: Jun. 23, 2016

(87) PCT Pub. No.: WO2015/097153
PCT Pub. Date: Jul. 2, 2015

(65) Prior Publication Data
US 2016/0323172 A1     Nov. 3, 2016

(30) Foreign Application Priority Data

Dec. 23, 2013   (EP) ..................................... 13275333
Dec. 23, 2013   (GB) ..................................... 1322883.8

(51) Int. Cl.
| H04L 12/26 | (2006.01) |
| H04L 12/755 | (2013.01) |
| H04L 12/743 | (2013.01) |

(52) U.S. Cl.
CPC ............ *H04L 43/12* (2013.01); *H04L 43/028* (2013.01); *H04L 45/021* (2013.01); *H04L 45/7453* (2013.01)

(58) Field of Classification Search
None
See application file for complete search history.

(56) References Cited

U.S. PATENT DOCUMENTS

| 6,101,170 | A | 8/2000 | Doherty et al. |
| 7,747,737 | B1 | 6/2010 | Apte et al. |
| 2003/0081615 | A1 | 5/2003 | Kohn et al. |
| 2010/0214913 | A1* | 8/2010 | Kompella ............. H04L 45/125 370/230 |
| 2012/0014265 | A1* | 1/2012 | Schlansker ............. H04L 43/18 370/252 |

FOREIGN PATENT DOCUMENTS

JP    2008-263436 A    10/2008

OTHER PUBLICATIONS

International Preliminary Report on Patentability and Written Opinion dated Jul. 7, 2016 from related PCT/EP2014/078994.
International Search Report and Written Opinion dated Mar. 17, 2015 issued in PCT/EP2014/078994.

(Continued)

*Primary Examiner* — Kodzovi Acolatse
(74) *Attorney, Agent, or Firm* — Scully, Scott, Murphy & Presser, P.C.

(57) ABSTRACT

An apparatus and method are provided for capturing dynamically selectable data streams from a communications network substantially at network line rates and for routing packets in selected data streams to one or more pre-assigned outputs by means of multiple selectable data processing queues.

9 Claims, 1 Drawing Sheet

(56) References Cited

OTHER PUBLICATIONS

Extended European Search Report dated May 2, 2014 issued in EP 13275333.6.
GB Search Report dated Jun. 30, 2014 issued in GB 1322883.8.
Liu, Tingwen, "Load Balancing for Flow-based Parallel Processing Systems in CMP Architecture", Global Telecommunications Conference 2009, IEEE, Piscataway, NJ (Nov. 30, 2009), pp. 1-7.
Nelms et al., "Packet Scheduling for Deep Packet Inspection on Multi-Core Architectures", Architectures for Networking and Communications Systems (ANCS), 2010 ACM/IEEE Symposium on, IEEE, Piscataway, NJ (Oct. 25, 2010), pp. 1-11.
Duffield, Nick (Editor), "A Framework for Passive Packet Measurement", Internet-Draft, draft-ietf-psamp-framework-03.txt, Jun. 1, 2003.
Office Action dated Jun. 12, 2017 issued by European Patent Office in related EP 14 816 295.1.

* cited by examiner

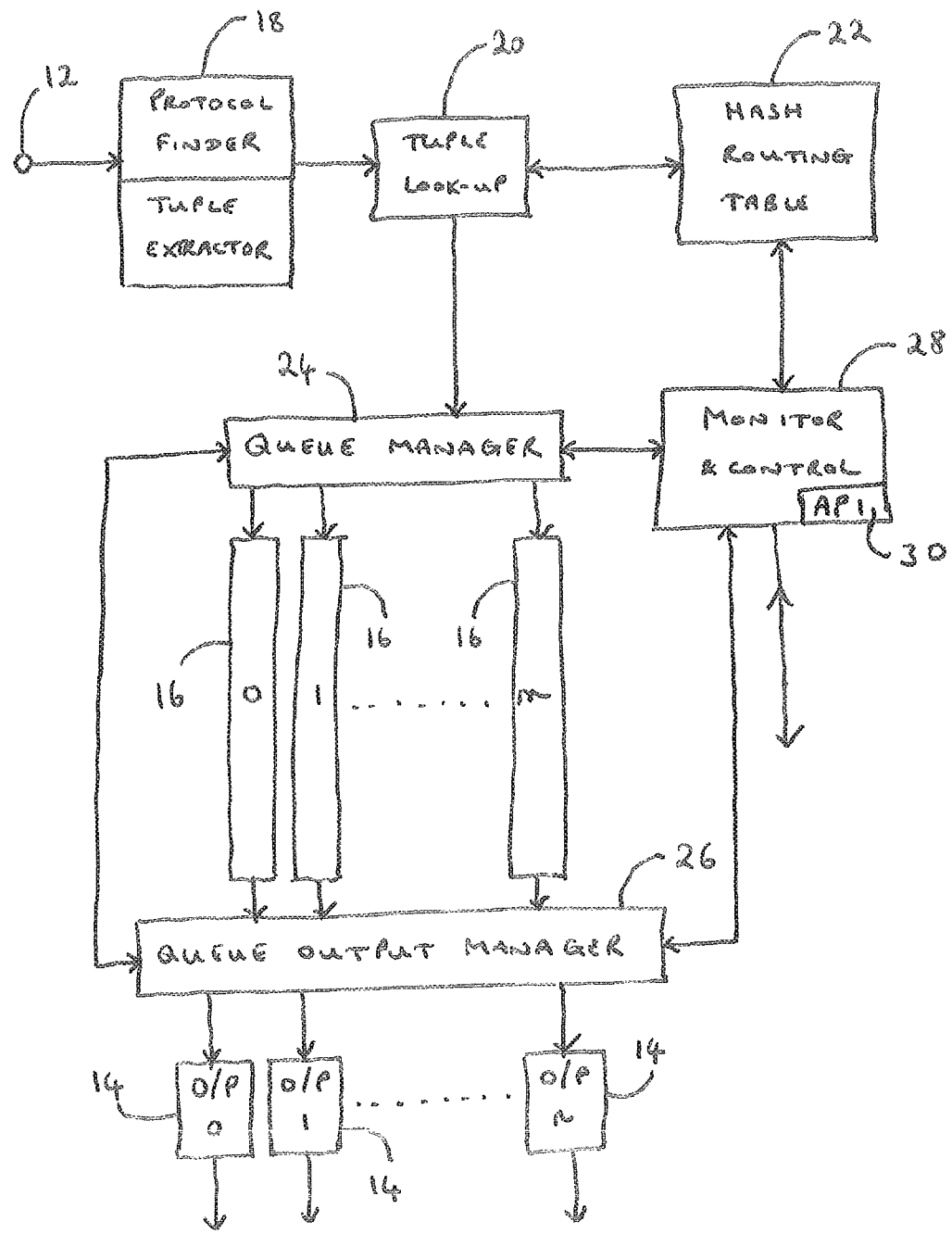

DATA CAPTURE

This invention relates to data capture and in particular, but not exclusively, to the selective capture of data packets being carried over a communications network and to the routing of captured data packets to one or more outputs.

There are numerous known examples of situations in which data needs to be routed or distributed to a number of possible recipients on the basis of static or dynamically alterable routing criteria. Routing criteria may, for example, take account of current loading on a potential recipient, the functional capabilities of a potential recipient for processing the data or the available bandwidth on a network pathway or interface when deciding how to distribute data and to what destination. Examples of such routing functionality occur in telecommunications networks, distributed computing environments and traffic management, to name only a few.

One known category of data distribution relates to "load balancing" in which an attempt is made to take account of the processing load that will be imposed on each of a number of available recipients when distributing data to those recipients. Distribution algorithms may follow a simple "round-robin" process in which appropriate portions of data are routed in turn to a different one of the available recipients in a predetermined order. More sophisticated load balancing algorithms are also known, making routing decisions on the basis of various criteria relating to the status and properties of a potential recipient to receive and process data at any given time. Load balancing is particularly useful where consumption of available data processing resources needs to be optimised, for example where data rates are high. At the highest data rates, decisions on routing of data need to be made rapidly and innovative solutions are required to enable data processing applications to keep up with the rate of receipt of data.

There are situations in which at least a portion of network traffic data, for example data packets carried over IP networks, needs to be captured and processed substantially at network data rates. In IP networks, those network data rates may be limited ultimately by the speed at which IP routers are able to make and implement routing decisions when forwarding IP data packets over the network. IP network data rates may currently extend to 100 GBits/s. In the absence of a more rapid data processing device than a dedicated IP router, IP network data analysis tools are likely to require a parallel arrangement of data processors, coupled with means to distribute captured network traffic across the available data processors in an efficient manner, if the data analysis is to keep pace with the rate of capture of data from the network.

From a first aspect, the present invention resides in a data probe, comprising:

an input for receiving data packets;

a plurality of outputs for outputting received data packets;

a protocol finder for selecting received data packets containing indications of a predetermined protocol;

a tuple extractor for reading from each selected packet a tuple comprising a predetermined characterising combination of data items;

a routing table containing, for each in a predetermined range of values, a destination identifier indicative of one of the plurality of outputs or a value to indicate that a data packet is not to be routed;

a tuple look-up module for calculating, using a predetermined function, a value within the predetermined range of values from a tuple, read from a selected data packet and for determining, with reference to the routing table, a corresponding destination identifier; and queuing means comprising a plurality of data processing queues linked to the plurality of outputs, arranged to receive a selected data packet and a corresponding destination identifier from the tuple look-up module and to route the data packet to one of the plurality of outputs, as defined by the corresponding destination identifier, by means of a selected one of the plurality of data processing queues.

In preferred embodiments of the present invention, data packets may be selected on the basis of their protocol or a particular communications session and a routing decision may be made very rapidly on the basis of a simple value calculation. The tuple extractor and the tuple look-up module, in particular, are preferably implemented using hardware for greatest possible speed of their respective functionality. The data processing queues may be configured to provide buffering of data packets according to the ability of downstream systems to process the output data packets.

In a preferred embodiment, the predetermined function is a hashing function arranged to generate a unique value in the predetermined value range for each distinct tuple read by the tuple extractor. The routing table may therefore comprise an array of storage locations of dimension equal to the number of values in the predetermined range, each storage location containing a respective destination identifier or a value to indicate that data packets carrying a particular tuple are not to be routed.

Preferably, the data probe further comprises control means for receiving signals from the queuing means indicative of the status of one or more of the plurality of queues and to apply one or more rules for amending the contents of the routing table. In this way, routing decisions may be reviewed on the basis of the rate at which data packets are entering a queue or being taken from a corresponding output by downstream systems, for example terminating the data stream or directing respective data packets to another output or via another queue.

In general, the control means are further arranged to receive data capture requirements and to make changes to one or more of the protocol finder, the tuple extractor and the routing table to implement the received data capture requirements. Such data capture requirements may include at least one of:

capture of data packets for a defined protocol and containing a defined tuple;

capture of data packets originating from or destined for a defined IP address;

capture of data packets originating from or destined for a defined sub-network;

capture of data packets relating to a defined Virtual network channel;

assignment of one of a plurality of priority values to defined tuple; termination of a defined data capture requirement;

assignment of a defined one of said plurality of outputs to a defined tuple; and scheduling of a defined data capture requirement to be implemented at a defined time or over a defined time period or periods.

Preferably, the data probe further comprises queue management means for applying one or more queue management algorithms when selecting a data processing queue for routing a received data packet to one of the plurality of outputs. Preferably, the queue management means are arranged to route data packets having the same tuple via the same data processing queue.

In a preferred embodiment, the predetermined characterising combination of data items comprises data items whose values are sufficient to identify a distinct communications session under the predetermined protocol. However, in principle, selection and routing decisions may be implemented on the basis of any predetermined combination of data items appearing in required data packets.

From a second aspect, the present invention resides in a method for distributing received data packets to a plurality of outputs, comprising the steps:
(i) extracting a characterising set of data from a received data packet;
(ii) applying a predetermined function to calculate a value within a predetermined value range from the extracted set of data;
(iii) reading, from a routing table containing a configurable mapping between values in the predetermined range and respective destination identifiers each defining one of a plurality of outputs, a destination identifier corresponding to the calculated value;
(iv) routing the received data packet to an output defined by the corresponding destination identifier.

Preferably, step (iv) comprises routing the received data packet to the defined output via one of a plurality of data processing queues. In a preferred variation, step (iv) comprises routing data packets having the same calculated value via the same data processing queue. In a further preferred variation, the method further comprises the step:
(v) receiving an indication of queue status and, in dependence thereon, triggering an amendment to the routing table to change the destination identifier corresponding to the calculated value thereby to direct further data packets having the same characterising set of data to a different output, or via a different data processing queue or to store a predetermined destination identifier indicating that data packets carrying the same characterising set of data are no longer to be routed to one of the plurality of outputs.

In a preferred embodiment, the method further comprises the step:
(vi) receiving a requirement to output data packets containing a defined set of data at a defined one of the plurality of outputs and for amending the routing table to include a corresponding destination identifier in respect of the value obtained by applying the predetermined function to the defined set of data.

Preferred embodiments of the present invention provide a method and apparatus for making a rapid and reconfigurable selection of data to be forwarded for processing, combined with a load balancing technique that ensures that data packets relating to the same communications session are directed ultimately to the same output. For greatest load balancing efficiency, data packets relating to the same communications session are directed to a given output by means of a common data processing queue. This not only saves time in downstream processing systems, substantially avoiding the need for reassembling data packets into data streams or in processing incomplete data streams, but also facilitates a more controlled reconfiguration of the data selection front-end, avoiding the possibility of partial data streams being held in a data processing queue when a stream is 'turned off' or sub-divided.

Some degree of automation may be applied to the data packet selection process, taking account of the status of data processing queues in an automatic reconfiguration of the packet selection criteria or routing criteria, based upon predetermined rules. Different data streams may be assigned a different level of priority by downstream systems, or according to other predetermined criteria, such that lower priority data streams may be 'turned off' should the respective data processing queue become over-loaded or the stream may be redirected to another data processing queue.

Preferred embodiments of the present invention will now be described in more detail with reference to FIG. 1; a functional representation of a data processing architecture for achieving data capture and data distribution according to preferred embodiments of the present invention.

Preferred embodiments of the present invention are directed to what may be called a "next-generation data probe", for capturing IP traffic at network data rates, e.g. of up to 100 GBits$^{-1}$, and to presenting selected portions of that IP traffic to down-stream systems for further processing. The present invention recognises that the rate of data capture may typically exceed the achievable real-time rate of data processing by those down-stream systems and that a rapidly reconfigurable method of selection is required to ensure that only those data packets in data streams of current potential interest are forwarded to downstream systems; the remainder being discarded.

The present invention also recognises that it would be useful to ensure that data packets in a selected data stream are presented to downstream systems as a contiguous stream rather than allowing a stream to be become fragmented across a number of outputs such that valuable downstream processing is consumed in reassembling streams. If any selected data packets need to be dropped, for whatever reason, then preferably the whole of the respective data stream may be dropped, rather than losing a part of a data stream or of multiple data streams. To achieve this, the present invention incorporates a queuing scheme that is sensitive to the rate at which data may be consumed by downstream systems and is highly responsive to changing requirements for the capture of data and their relative priority.

For greatest downstream processing efficiency, the present invention ensures that data packets in the same data stream are routed to a common predetermined output or outputs according to the requirements of downstream systems. A preferred data probe and method for achieving this and other advantageous features will now be described in more detail with reference to FIG. 1.

Referring to FIG. 1, a data probe 10 is shown for capturing data, preferably in the form of data packets passing over a packet network (not shown in FIG. 1). Data packets are captured at an appropriate network tap point 12 and, subject to selection criteria applied at an early stage, are routed through the apparatus 10 according to reconfigurable routing criteria such that they emerge from one or more of n controllable outputs 14. The routing criteria are designed to ensure that data packets associated with a given data stream, as defined by an Open Systems Interconnect (OSI) transport layer 4 protocol such as TCP or UDP or by a higher layer protocol, are directed to a predetermined one or more of the n outputs 14 by means of one or more of m data processing queues 16. This ensures not only that all the data packets in a given data stream are consistently available to downstream processors from the same output or outputs 14, but also that any subsequent action upon the data stream, such as a decision to suspend capture of data packets within that particular stream, will have the least possible effect on the capture of other streams, not leaving data packets from a suspended stream blocking a queue 16 and not spreading such data packets over multiple queues, unless intentionally.

Data packets captured at the tap point 12 are input to a protocol finder and tuple extractor 18 for identifying, firstly, any data packets that contain indications of one or more relevant protocols and, for any that do, reading from the packet a predetermined set—a "tuple"—of data items specific to the indicated protocol or likely to be found in packets being transported under the indicated protocol. Packets relating to other protocols are discarded at this point.

A tuple in this case comprises a set of data items sufficient to enable data packets in a distinct communications session (data stream) to be identified for each relevant protocol. For example, if the transport protocol is identified as TCP/IP, then a tuple of data items sufficient to identify data packets according to a distinct TCP/IP session may comprise:

Source IP Address;
Source Port Number;
Destination IP Address;
Destination Port Number; and
TCP Identification.

Corresponding tuples of data items may be defined in respect of other identifiable data streams, e.g. sessions over particular virtual channels or over specific circuits in MPLS networks. To distinguish streams of data packets being conveyed over different virtual private network (VPN) channels, including those passing through mobile communications networks, the tuple data items in that case may further comprise data items such as:

VLAN Tag;
MPLS Label(s);
GTP Tunnel Identifier.

Data packets may also be selected, for example, in respect of particular e-mail message sources or destinations as defined within respective e-mail messaging protocols. Further data packet selection criteria may be implemented by this technique, whether or not the data items are specifically related to any one protocol.

Having selected a data packet of a relevant protocol, the protocol finder/tuple extract module 18 passes the data packet and the corresponding tuple values to a Tuple Look-up module 20, arranged to calculate a hash value for the received tuple using a predetermined hashing function and to perform a look-up of the calculated hash value in a configurable Hash Routing Table 22. Any one of a number of known hashing functions may be selected for implementation by the tuple look-up module 20, selected in particular for the speed at which they can be executed to map a received tuple onto a unique value in a predetermined range, for example in the range of 0 to 1023, a different value being generated for each distinct tuple of interest. The range of possible hash values may be selected according to the largest expected number of streams likely to be required by downstream systems at any one time.

The Hash Routing Table 22 comprises a block of memory locations each addressable by one of the possible hash values that can be generated by the hashing function, for example 1024 locations. At each memory location corresponding to the hash value of a tuple to be made available to downstream systems, a corresponding 'destination' identifier is stored. The memory locations addressed by any unused hash values, or the hash values of a tuple not currently of interest, are set to null or to some other predetermined value to indicate that the hash value, and hence a data packet containing the associated tuple, is not to be forwarded. The Tuple Look-up module 20 retrieves the destination identifier value stored at the memory location addressed by the calculated hash value and, if it is not null, passes the captured data packet and destination identifier to a Queue Manager 24. If the destination identifier returned is null, then the tuple look-up module 20 discards the data packet as not being of current interest.

The destination identifier stored in the Hash Routing Table 22 for those hash values representing data streams of interest may comprise an identifier for one of the n outputs 14, on the basis that downstream data processing systems (not shown in FIG. 1) are configured to read data relating to particular data streams of interest from predetermined outputs 14, or the identifier may relate more directly to one or more of the m data processing queues 16, for example indicating that a dedicated one or more of the available queues 16 should be allocated by the Queue Manager 24 to receive data packets associated with that particular identifier. Alternatively, the identifier may be interpreted by the Queue Manager 24 as the identifier of the particular data processing queue 16 intended to receive the packet.

The queue manager 24 is arranged to operate in conjunction with a Queue Output Manager 26 to ensure that data packets associated with a particular destination identifier are output from the respective output 14 on emerging from one of the m data processing queues 16 selected by the queue manager 24. Except in the case that the destination identifier is intended to map directly onto one of the queues 16, the queue manager 24 is arranged to implement standard queue management techniques in the selection of queues 16, but with the objective of ensuring that, as far as possible, data packets within a given data stream, i.e. preferably those with the same allocated destination identifier, are routed through the same queue 16. This has the advantage of simplifying the implementation of configuration changes, such as a decision to cease receiving a particular data stream without disrupting the flow of other data streams through the queues 16.

In a simple implementation, the number m of queues 16 may equal the number n of outputs 14, allowing for a one-to-one correspondence between a queue 16 and an output 14. In that case the destination identifier may define both the output 14 and the queue 16 through which the respective data packets shall be routed by the queue manager 24. However, providing for an interplay between the queue manager 24 and the queue output manager 26 enables greater flexibility in the management of queues 16 and, as would be apparent to a notional skilled person in the field, provides the opportunity to implement a variety of data queuing techniques according to the different queue loading scenarios most likely to arise in a particular application. In particular, the queue output manager 26 may take a data packet from any one of the m queues and output it to any one or more of the n outputs 14 defined by its destination identifier.

In one example embodiment, the selection of a queue 16 by the queue manager 24 may be independent of the destination identifier defined for a received data packet of a particular data stream, so long as the queue output manager 26 is configured to take the data packet from the selected queue 16 and pass it to the output 14 specified by the destination identifier for the packet. The queue manager 24 and the queue output manager 26 are arranged to store a mapping between a destination identifier allocated to a particular data stream and an identifier for the queue 16 selected to carry packets in that data stream. The queue manager 24 may route all the data streams having the same destination identifier through the same queue 16, or use the same queuing strategy, so that data packets pass through a selected queue 16 in the order of receipt; downstream systems taking responsibility for re-assembling data streams emerging from a given output 14.

Alternatively, or in addition, the stored mapping may include further information to enable the Queue Manager 24 to distinguish between data packets belonging to multiple data streams that may have been assigned the same destination identifier. In an example implementation, the Hash Routing Table 22 may be integrated with the Queue Manager 24 so that the Queue Manager 24 is able to take account of both a received hash value—a data stream identifier—and the destination identifier stored in the Hash Routing Table 22 for that received hash value when deciding which queue 16 should receive a given data packet.

The mapping of destination identifier to queue 16, or of a data stream identifier and a queue 16, may take account of various measures of queue status, including queue capacity, both maximum and current rate of receipt of packets by each queue 16 and mean rate of output from each queue 16 over a given period of time. Besides using such information to determine which queue 16 to use for a given data stream, the queue manager 24 is arranged to output details of queue status to a Monitoring and Control module 28 so that configuration changes, for example to alter one or more destination identifiers stored in the hash routing table 22, may be implemented to maintain the flow of required data through the apparatus or to implement predetermined prioritisation measures in respect of particular data streams. Optionally, a communications path may be provided between the monitoring and control module 28 and the queue output manager 26 to receive information relating to the rate of removal of data packets at each output and to enable configuration changes to be made by the control module 28 to the mapping between queue 16 and output 14.

The monitoring and control module 28 is arranged with access to update the contents of the hash routing table 22, taking account not only of the status information provided by the queue manager 24, but also responding to other selection and routing criteria defined in received data capture requirements that may be input to the monitoring and control module 28 from other sources, such as the downstream systems. In response to such requirements, the monitoring and control module 28 is arranged to make updates to the content of the routing hash table 22 to take account of some or all of the information it receives, implementing one or more predetermined rules to ensure that data processing capacity is fully utilised and that as high a proportion as possible of the requested data streams are captured and queued and made available to downstream systems at one or more defined outputs 14. The module 28 is also arranged to reconfigure the protocol finder/tuple extract module 18 in respect of the protocols it looks for and/or the corresponding tuple data items it extracts from matching packets.

Preferably the monitoring and control module 28 provides an application programmers' interface (API) 30 with a predefined command set to enable data capture requirements to be defined and updated by external systems.

By way of example, data capture requirements may include the following, for which corresponding updates to the configuration of the protocol finder/tuple extract module 18, the hash routing table 22, the queue manager 24 and the queue output manager 26 may be made under the control of the monitor and control module 28:

Capture of all data packets for a given protocol;
Capture of all data packets in a given protocol for a defined session;
Capture of some or all data packets originating from or destined for a defined IP address;
Capture of some or all data packets originating from or destined for a given sub-network;
Capture of all data packets relating to a defined Virtual network channel;
Assignment of one of a range of priority values to a data stream being captured;
Termination of any of the above defined data capture arrangements;
Definition of or change to the output or outputs for a defined group of captured data packets; and
Definition of a timed data capture arrangement, e.g. capture of a defined data stream over a scheduled one-off or recurring time period.

By way of example, an update to data capture requirements may comprise a request for a data stream, being currently received in respect of a particular protocol, to be further subdivided between outputs 14 on the basis of some additional data item. The monitoring and control module 28 is arranged to reconfigure the protocol finder/tuple extract module 18 to modify the tuple extracted for the respective protocol to include the additional data item. The module 18 is also arranged to make corresponding amendments to the content of the hash routing table 22 to store one or more further destination identifiers at the locations that will be addressed by hash values calculated for the sub-divided stream tuples, if necessary setting the destination identifier entries for the previous stream to null. The module 18 may also need to reconfigure the queue manager 24 and queue output manager 26 to ensure that any new destination identifiers defined in the hash routing table 22 are recognised and cause corresponding data packets to be routed to the correct output or outputs 14 via appropriately selected queues 16.

Other data capture requirements, as would be apparent to a person of ordinary skill in the relevant art may be supported by the monitor and control module 28 using a common set of functionality as defined above.

The queue manager 24, in conjunction with the queue output manager 26, has the objective of making available to downstream systems, at the outputs 14, as great a proportion as possible of the captured data packets within any given data stream. The queue manager 24 has available to it a number of data processing queues 16, each having a buffering capacity designed according to the expected rate of consumption of data by downstream systems from the outputs 14, the expected rate of receipt of data packets directed by the tuple look-up module 20 and risk factors such as an acceptable probability of data loss from a critical data stream due to a failure of downstream systems to take data quickly enough. Standard load balancing rules may be applied by the queue manager 24 to make substantially optimal use of the available storage capacity of the queues 16 at any given time. However, the queue manager 24 operates with the additional constraint that data packets in each selected data stream are to be kept together as far as possible, not least to ensure that all packets in a given data stream will be output at the same predefined output 14 defined by the respective destination identifier.

Upon first receipt of a new destination identifier, the queue manager 24 allocates an available queue 16 to that identifier and stores the mapping for as long as the respective data stream persists. All packets associated with that destination identifier are directed to the allocated queue 16 in the order of receipt. However, the queue manager 24 is arranged to monitor the current and projected capacity of the allocated queue 16 and any other factors likely to affect the ability of the queue manager 24 to buffer data packets in the respective stream. In particular, the queue output manager 26 is arranged to monitor the rate at which data packets are being read from each output 14 and, according to a predefined mapping of queue 16 to output 14, from each queue 16. The queue output manager 26 communicates the results of the monitoring to the queue manager 24 to enable individual and overall changes in queue capacity to be monitored and anticipated.

If a given queue 16 is predicted to reach full capacity within a threshold time period, the queue manager 24 may allocate a further queue 16 to a given data stream (destination identifier), if available, and signal to the queue output manager 26 to begin taking data packets from the newly allocated queue 16 as soon all the packets in the previously allocated queue 16 have been read, feeding them to the same output 14. Alternatively, the queue manager 24 may signal the current or anticipated queue status to the monitor and control module 28. The monitor and control module 28 may, in response, and according to a received data capture requirement or according to predefined load balancing rules, arrange to terminate capture of a lower priority data stream, thereby vacating a queue 16 that the queue manager 24 may use for the more important data stream.

Of course, numerous variants on the load balancing capabilities that may be implemented in the present invention, in view of the above load balancing features, would be apparent to a person of ordinary skill in the relevant art and will not be itemised in detail here.

Preferred embodiments of the present invention may be implemented using a combination of hardware-implemented and software-implemented functionality. In particular, data packets captured at a conventional tap point 12 may be passed to a hardware-implemented protocol finder/tuple extract module 18. The protocol finder element may be based upon bit pattern matching functionality implemented using a content addressable memory (CAM) holding predetermined bit patterns representing one or more relevant protocols. CAM bank switching may be used to select between sets of bit patterns, for example to enable changes to be made dynamically in response to data capture requirements without interrupting data capture. Tuple extraction may be implemented using a field programmable gate array (FPGA) device to read data from predetermined positions within a protocol header.

The tuple look-up module 20 may be implemented in hardware and may use a known hardware-implementable hashing function to calculate a hash value for a received tuple, and pass the resultant value for look-up in the hash routing table 22. The hash routing table 22 may be implemented using a memory device in which the hash value comprises the address of a memory location at which there is stored either a valid destination identifier or a null, the latter indicating that the data packet is to be discarded. The tuple look-up module 20 is arranged to forward any packet having a non-null destination identifier to the queue manager 24.

The functionality of the queue manager 24 and the queue output manager 26 may be implemented in software executing on a conventional high-speed processing device linked to one or more memory devices for implementing the data processing queues 16. Similarly, the variety of functionality suggested above for the monitoring and control module 28 to control capture of data by the probe 10 may be implemented in software executing on the same or a different high-speed processing device.

Of course, other implementations are possible, as would be apparent to a person of ordinary skill in the relevant art, according to the expected rate of data capture and downstream processing to be supported. For example, an entirely software-implemented data probe 10 may be envisaged and may be adequate for a selected range of applications.

The invention claimed is:

1. A data probe, comprising:
   an input for receiving data packets;
   a plurality of outputs for outputting received data packets;
   a protocol finder for selecting received data packets containing indications of a predetermined protocol;
   a data extractor device for reading from each selected packet a predetermined combination of data items;
   a routing table containing, for each in a predetermined range of values, a destination identifier indicative of one of said plurality of outputs or a value to indicate that a data packet is not to be routed;
   a look-up device for calculating, using a predetermined function, a value within said predetermined range of values from the predetermined combination of data items, read from a selected data packet and for determining, with reference to the routing table, a corresponding destination identifier;
   a plurality of data processing queues linked to said plurality of outputs, arranged to receive a selected data packet and a corresponding destination identifier from the look-up device and to route the data packet to one of said plurality of outputs, as defined by the corresponding destination identifier, by means of a selected one of said plurality of data processing queues; and
   a queue manager for applying one or more queue management algorithms when selecting a data processing queue for routing a received data packet to one of said plurality of outputs,
   wherein the queue manager is configured to:
   route data packets having the same predetermined combination of data items or the same destination identifier via the same data processing queue; and
   in response to a given data processing queue being predicted to reach full capacity within a threshold time period, triggering an amendment to the routing table to change the destination identifier corresponding to said calculated value thereby to:
      allocate a further queue to data packets having the same predetermined combination of data items or the same destination identifier; or
      terminate the capture of said packets.

2. The data probe according to claim 1, wherein the predetermined function is a hashing function arranged to generate a unique value in said predetermined value range for each distinct predetermined combination of data items read by the data extractor device.

3. The data probe according to claim 1, further comprising a controller for receiving signals from the one or more of said plurality of data processing queues indicative of the status of one or more of said plurality of queues and to apply one or more rules for amending the contents of the routing table.

4. The data probe according to claim 3, wherein the controller is further arranged to receive data capture requirements and to make changes to one or more of the protocol finder, the data extractor and the routing table to implement said received data capture requirements.

5. The data probe according to claim 4, wherein said received data capture requirements include at least one of:
   capture of data packets for a defined protocol and containing a defined tuple;
   capture of data packets originating from or destined for a defined IP address;

capture of data packets originating from or destined for a defined sub-network;

capture of data packets relating to a defined Virtual network channel;

assignment of one of a plurality of priority values to defined tuple;

termination of a defined data capture requirement;

assignment of a defined one of said plurality of outputs to a defined tuple; and scheduling of a defined data capture requirement to be implemented at a defined time or over a defined time period or periods.

6. The data probe according to claim 1, wherein the data extractor device and the look-up device are implemented in hardware.

7. The data probe according to claim 1, wherein said predetermined characterising combination of data items comprise data items whose values, in combination, are sufficient to identify a distinct communications session under said predetermined protocol.

8. A method for distributing received data packets to a plurality of outputs, comprising the steps:

(i) extracting a characterising set of data from a received data packet;

(ii) applying a predetermined function to calculate a value within a predetermined value range from the extracted set of data;

(iii) reading, from a routing table containing a configurable mapping between values in said predetermined range and respective destination identifiers each defining one of a plurality of outputs, a destination identifier corresponding to said calculated value;

(iv) routing the received data packet to an output defined by the corresponding destination identifier via one of a plurality of data processing queues, wherein data packets having the same calculated value are routed via the same data processing queue; and (v) receiving an indication that a given queue is predicted to reach full capacity within a threshold time period, and, in dependence thereon, triggering an amendment to the routing table to change the destination identifier corresponding to said calculated value thereby to:

direct further data packets having the same characterizing set of data to a different output or via a different data processing queue; or store a predetermined destination identifier indicating that data packets carrying the same characterizing set of data are no longer to be routed to one of said plurality of outputs.

9. The method according to claim 8, further comprising the step:

(vi) receiving a requirement to output data packets containing a defined set of data at a defined one of said plurality of outputs and for amending the routing table to include a corresponding destination identifier in respect of the value obtained by applying the predetermined function to the defined set of data.

* * * * *